(12) United States Patent
Zhu

(10) Patent No.: US 9,170,630 B2
(45) Date of Patent: Oct. 27, 2015

(54) SERVER EXECUTING INSTANCES OF CLIENT APPLICATIONS IN ORDER TO ALLOW POWER SAVING BY THE CLIENT DEVICE

(71) Applicant: Huawei Device Co., Ltd., Shenzhen (CN)

(72) Inventor: Hongtao Zhu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 225 days.

(21) Appl. No.: 13/728,717

(22) Filed: Dec. 27, 2012

(65) Prior Publication Data

US 2013/0117587 A1    May 9, 2013

Related U.S. Application Data

(63) Continuation of application No. PCT/CN2011/073326, filed on Apr. 26, 2011.

(51) Int. Cl.
*G06F 1/32* (2006.01)
*H04W 52/02* (2009.01)
(Continued)

(52) U.S. Cl.
CPC ............. *G06F 1/3206* (2013.01); *H04L 67/08* (2013.01); *H04W 52/0216* (2013.01);
(Continued)

(58) Field of Classification Search
CPC ............ G06F 8/61; G06F 1/3203; G06F 1/26
USPC ......................................................... 713/310
See application file for complete search history.

(56) References Cited

U.S. PATENT DOCUMENTS 6,483,815 B1    11/2002  Laurent
7,042,865 B1 *   5/2006  Meier et al. ................... 370/338
(Continued)

FOREIGN PATENT DOCUMENTS

CN    1237861 A    12/1999
CN    1262819 A     8/2000
(Continued)

OTHER PUBLICATIONS

International Search Report issued in corresponding PCT application No. PCT/CN2011/073326, dated Feb. 9, 2012, total 4 pages.
(Continued)

*Primary Examiner* — Thomas Lee
*Assistant Examiner* — Santosh R Poudel
(74) *Attorney, Agent, or Firm* — Brinks Gilson & Lione

(57) ABSTRACT

The present invention provides a service processing method and a server, which belong to the field of mobile terminals. The method includes: installing, on a server, a service application same as that of a mobile terminal; running the service application on the server, and executing, in place of the mobile terminal, a service corresponding to the service application; determining, by the server according to a result of executing the service, whether the mobile terminal needs to be woken up; and when the service needs to wake up the mobile terminal, instructing the mobile terminal to process the service. The server executes a service in place of a mobile terminal, and when the mobile terminal needs to be woken up, instructs the mobile terminal to process the service, thereby reducing the power consumption of the mobile terminal, and extending the standby time and service life of the mobile terminal.

11 Claims, 2 Drawing Sheets

(51) Int. Cl.
*H04L 29/08* (2006.01)
*H04W 88/18* (2009.01)

(52) U.S. Cl.
CPC ..... *H04W 52/0229* (2013.01); *H04W 52/0274* (2013.01); *H04W 88/182* (2013.01); *Y02B 60/46* (2013.01); *Y02B 60/50* (2013.01)

(56) References Cited

U.S. PATENT DOCUMENTS

| | | | |
|---|---|---|---|
| 8,278,978 B1* | 10/2012 | Wright | 327/143 |
| 8,812,666 B2* | 8/2014 | Kikinis | 709/225 |
| 8,819,773 B2* | 8/2014 | Banzhof | 726/1 |
| 2005/0076086 A1* | 4/2005 | Budd et al. | 709/206 |
| 2006/0224688 A1* | 10/2006 | Morris | 709/217 |
| 2007/0266426 A1* | 11/2007 | Iyengar et al. | 726/5 |
| 2008/0141244 A1* | 6/2008 | Kelley | 717/178 |
| 2008/0209244 A1* | 8/2008 | Miller et al. | 713/322 |
| 2009/0034492 A1 | 2/2009 | Narasimhan | |
| 2009/0144359 A1* | 6/2009 | Karlsen et al. | 709/203 |
| 2009/0180598 A1* | 7/2009 | Othmer et al. | 379/88.23 |
| 2009/0318145 A1* | 12/2009 | Lu et al. | 455/434 |
| 2010/0064341 A1* | 3/2010 | Aldera | 726/1 |
| 2010/0257384 A1* | 10/2010 | Tsai et al. | 713/310 |
| 2010/0332212 A1* | 12/2010 | Finkelman | 703/23 |
| 2011/0007679 A1* | 1/2011 | Tsai | 370/311 |
| 2011/0151944 A1* | 6/2011 | Morgan | 455/574 |
| 2011/0173605 A1* | 7/2011 | Bourne | 717/176 |
| 2011/0231680 A1* | 9/2011 | Padmanabhan et al. | 713/310 |
| 2011/0296011 A1* | 12/2011 | Dare et al. | 709/224 |
| 2012/0072481 A1* | 3/2012 | Nandlall et al. | 709/203 |
| 2012/0131663 A1* | 5/2012 | Anchan | 726/13 |
| 2012/0264443 A1* | 10/2012 | Ng et al. | 455/450 |
| 2013/0132854 A1* | 5/2013 | Raleigh et al. | 715/738 |

FOREIGN PATENT DOCUMENTS

| | | |
|---|---|---|
| CN | 101161002 A | 4/2008 |
| CN | 101247563 A | 8/2008 |
| CN | 101309294 A | 11/2008 |
| CN | 102065103 A | 5/2011 |
| CN | 102118406 A | 7/2011 |
| EP | 2306267 A2 | 4/2011 |
| JP | 2000165419 A | 6/2000 |
| WO | 2004095193 A2 | 11/2004 |
| WO | 2009013937 A1 | 1/2009 |
| WO | 2010039022 A2 | 4/2010 |

OTHER PUBLICATIONS

First office action issued in corresponding Chinese patent application 201180000525.X, dated Aug. 3, 2012, and English translation thereof, total 5 pages.

Search report issued in corresponding European patent application No. 11755700.9, dated May 27, 2013, total 7 pages.

* cited by examiner

SERVER EXECUTING INSTANCES OF CLIENT APPLICATIONS IN ORDER TO ALLOW POWER SAVING BY THE CLIENT DEVICE

CROSS-REFERENCE TO RELATED APPLICATIONS

This application is a continuation of International Application No. PCT/CN2011/073326, filed on Apr. 26, 2011, which is hereby incorporated by reference in their entireties.

FIELD OF THE INVENTION

The present invention relates to the field of mobile terminals, and in particular, to a service processing method and a server.

BACKGROUND OF THE INVENTION

In evaluating the performance of a mobile terminal, power consumption is a very important factor because power consumption directly affects the standby time and service life of the mobile terminal.

At present, many services need self-processing and self-maintenance of the mobile terminal, and several common services are listed in the following:

A mobile terminal, in some data services, needs to keep a connection path to achieve data push based on the connection. Here, the mobile terminal keeps a PDP (Packet Data Protocol, Packet Data Protocol) connection for a long time and an address is fixed, which therefore might be tracked. For example, a hacker scans fixed addresses in a network segment and at this time the mobile terminal has to be woken up to process the junk request and then enters into sleep. However, if the frequency of requests reaches a certain degree, it might become difficult for the mobile terminal to enter into sleep, thereby causing an increase to the power consumption of a mobile phone.

When the mobile terminal is in a standby state, to maintain a long connection, a heartbeat needs to be initiated to a server regularly, which also causes a data traffic problem and further causes an increase to the power consumption of the mobile phone.

The firewall technology of the mobile terminal may shield an IP segment and some ports to achieve access denial. However, before the mobile terminal receives and parses a request packet and discards an unusable request packet, the mobile terminal needs to be woken up, which also causes an increase to the power consumption of the mobile phone.

In conclusion, the existing service processing manner increases the power consumption of a mobile terminal and reduces the standby time and service life of a mobile terminal.

SUMMARY OF THE INVENTION

To reduce the power consumption of a mobile terminal and extend the standby time and service life of a mobile terminal, embodiments of the present invention provide a service processing method and a server. The technical solutions are as follows:

A service processing method includes:

installing, on a server, a service application same as that of a mobile terminal; running the service application on the server, and executing, in place of the mobile terminal, a service corresponding to the service application;

determining, by the server according to a result of executing the service, whether the mobile terminal needs to be woken up; and when the service needs to wake up the mobile terminal, instructing, by the server, the mobile terminal to process the service.

A server includes:

an installation module, configured to install a service application same as that of a mobile terminal;

an execution module, configured to run the service application, and execute, in place of the mobile terminal, a service corresponding to the service application;

a determination module, configured to determine, according to a result of executing the service, whether the mobile terminal needs to be woken up; and an instruction module, configured to: when the service needs to wake up the mobile terminal, instruct the mobile terminal to process the service.

The technical solutions of the present invention bring about the following beneficial effects:

Through installing the service application same as that of a mobile terminal on a server, receiving a hosting rule entrusted by the mobile terminal, invoking a corresponding service application according to the hosting rule, and executing, in place of the mobile terminal, a service corresponding to the hosting rule, and waking up the mobile terminal only when the service needs to wake up the mobile terminal, so that the number of times of waking up the mobile terminal is reduced to a great extent, thereby reducing the power consumption of the mobile terminal, and extending the standby time and service life of the mobile terminal.

DETAILED DESCRIPTION OF THE EMBODIMENTS

To make the objectives, technical solutions, and advantages of the present invention clearer, the following further clearly describes the technical solutions in the embodiments of the present invention with reference to the accompanying drawings.

Embodiment 1

Figure 1:
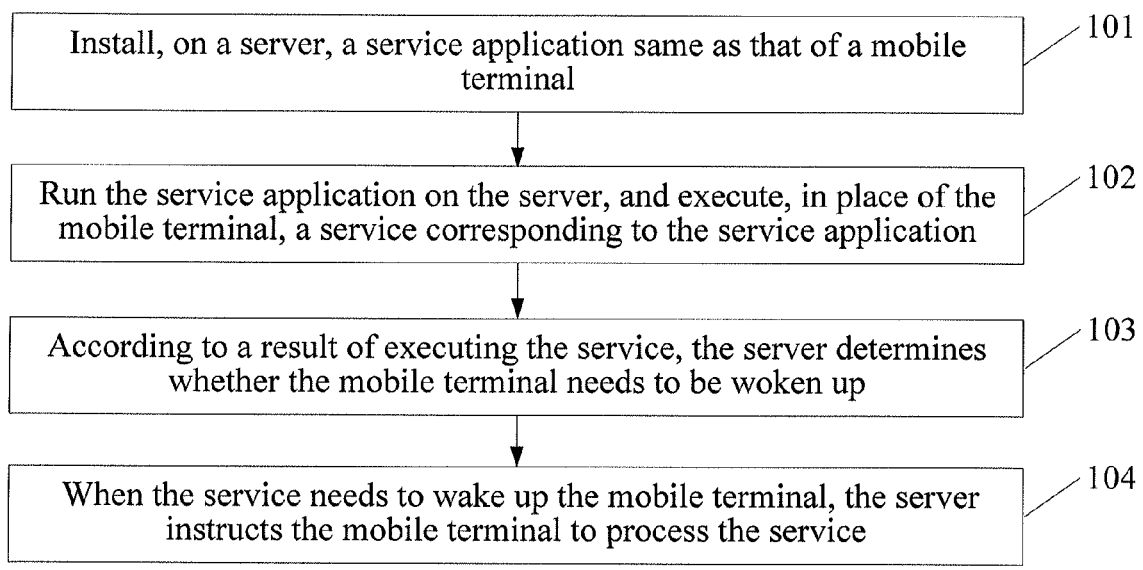
FIG. 1 is a flow chart of a service processing method according to Embodiment 1 of the present invention.

Referring to FIG. 1, an embodiment of the present invention provides a service processing method, and the method may be performed by a server. Furthermore, the method may be performed by a virtual terminal residing on the server. The method includes:

101: Install, on the server, a service application same as that of a mobile terminal.

102: Run the service application on the server, and execute, in place of the mobile terminal, a service corresponding to the service application.

103: According to a result of executing the service, the server determines whether the mobile terminal needs to be woken up.

104: When the service needs to wake up the mobile terminal, the server instructs the mobile terminal to process the service.

In this embodiment, through installing the service application same as that of the mobile terminal on the server, receiving a hosting rule entrusted by the mobile terminal, invoking a corresponding service application according to the hosting rule, and executing, in place of the mobile terminal, a service corresponding to the hosting rule, and waking up the mobile terminal only when the service needs to wake up the mobile terminal, so that the number of times of waking up the mobile terminal is reduced to a great extent, thereby reducing the power consumption of the mobile terminal, and extending the standby time and service life of the mobile terminal.

Embodiment 2

Figure 2:
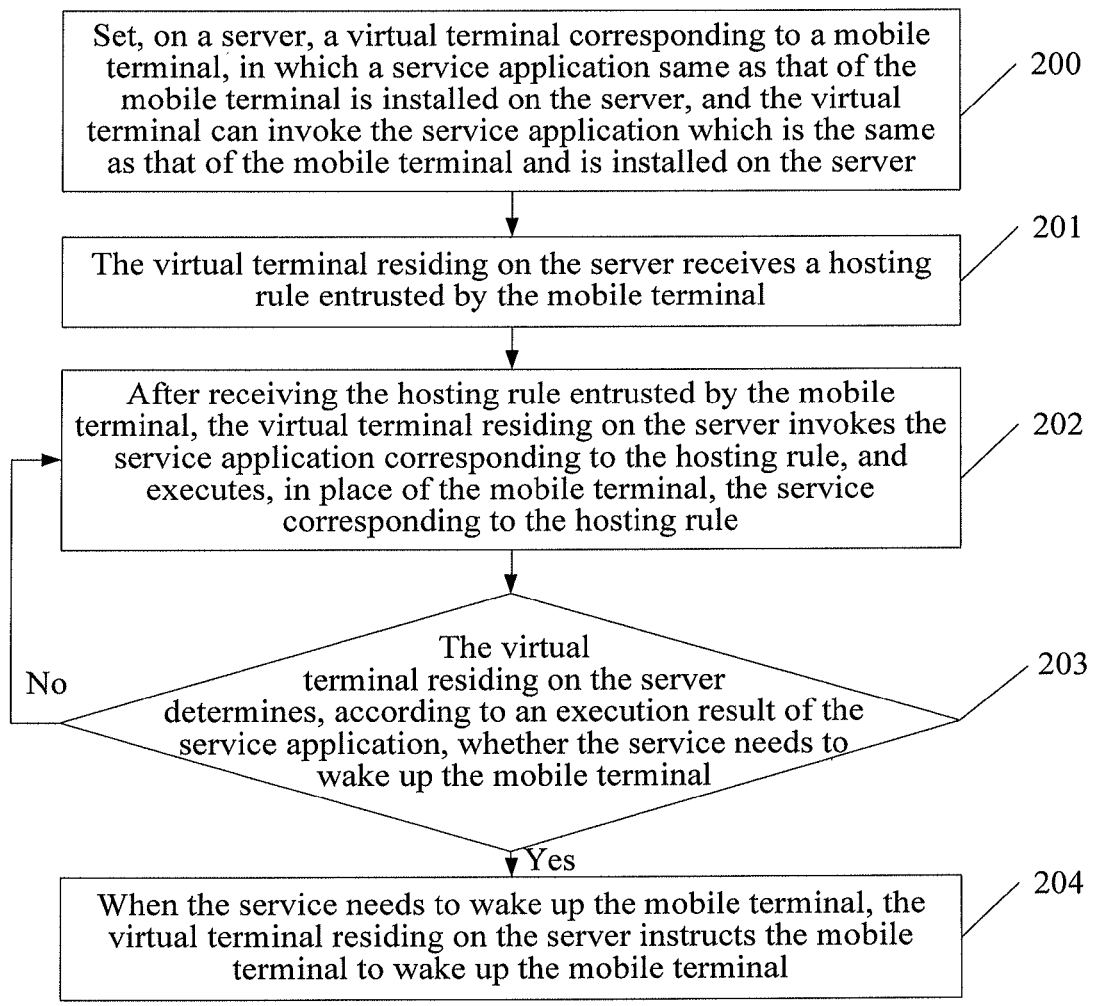
FIG. 2 is a flow chart of a service processing method according to Embodiment 2 of the present invention.

This embodiment is developed on the basis of Embodiment 1, and referring to FIG. 2, a service processing method provided by this embodiment includes:

200: Set, on a server, a virtual terminal corresponding to a mobile terminal, in which a service application same as that of the mobile terminal is installed on the server, and the virtual terminal can invoke the service application which is the same as that of the mobile terminal and is installed on the server.

Because the server stays in a working state all the time, the virtual terminal may stay online for a long time, and the virtual terminal may have a communication address, other devices may perform a communication service through the virtual terminal, thereby avoiding the problem that other parties cannot be found in the NAT (Network Address Translation, Network Address Translation) technology. In addition, the service application installed on the server may be updated synchronously with the corresponding service application on the mobile terminal.

Specifically, the service application installed on the mobile terminal is installed on the server, and may be all or a part of initial service applications installed on the mobile terminal, or may also be a part or all of service applications updated subsequently on the mobile terminal. Furthermore, the virtual terminal may duplicate a binary package corresponding to the service application and store the binary package on the server, so that the service applications installed on the server are identical to those on the mobile terminal.

The virtual terminal specifically may be implemented by improving an android emulator, and the improvement method includes: adding a hosting module on the android emulator, where the hosting module registers content entrusted by each application, so that information processed by the virtual terminal is received by the hosting module first and then stored instead of being directly sent to an actual mobile terminal, and stored information is sent to the mobile terminal when the mobile terminal is woken up, and here the virtual terminal can serve only one corresponding mobile terminal; or, the virtual terminal may specifically be an agent application installed on the server, and the agent application may serve multiple mobile terminals in a time division manner.

201: The virtual terminal residing on the server receives the hosting rule entrusted by the mobile terminal.

Specifically, in a first method, the virtual terminal and the mobile terminal agree on a hosting rule in advance, and the mobile terminal chooses a hosting rule that is agreed on in advance and sends a setting command to the virtual terminal. In a second method, the virtual terminal and the mobile terminal establish an entrusting language, and the mobile terminal sends the hosting rule according to the entrusting language.

The hosting rule may be executing a path connecting operation, executing a firewall filtering operation or executing a user-defined operation. The path connecting operation includes a periodical polling operation or a periodical heartbeat operation, and the mobile terminal can, in a standby state, entrust the path connecting operation to the virtual terminal residing on the server.

202: After receiving the hosting rule entrusted by the mobile terminal, the virtual terminal residing on the server invokes a service application corresponding to the hosting rule, and executes, in place of the mobile terminal, the service corresponding to the hosting rule.

Because the hosting rule and the service application correspond to each other, a service corresponding to the hosting rule is the service corresponding to the corresponding service application of the hosting rule.

203: The virtual terminal residing on the server determines, according to an execution result of the service application, whether the service needs to wake up the mobile terminal.

Specifically, when the service does not need to wake up the mobile terminal, perform step 202; and when the service needs to wake up the mobile terminal, perform step 204.

When the hosting rule is executing the path connecting operation, and if in the execution result, a service corresponding to the path connecting operation receives actual service data, the virtual terminal determines that the service needs to wake up the mobile terminal, so step 204 is performed; and otherwise, if in the execution result, the service does not receive actual service data, for example, a query result of the polling operation is empty, or the heartbeat operation is normal but no service data is received or sent, the virtual terminal determines that the service does not need to wake up the mobile terminal, so step 202 is performed, and the virtual terminal continues executing, in place of the mobile terminal, the service corresponding to the hosting rule. When the hosting rule is executing the firewall filtering operation, and if in the execution result, a service corresponding to the firewall filtering operation receives service data which does not conform to a firewall deny rule or conforms to a firewall allow rule, the virtual terminal determines that the service needs to wake up the mobile terminal, so step 204 is performed; and otherwise, if in the execution result, the service does not receive service data which does not conform to the firewall deny rule or conforms to the firewall allow rule, for example, all received service data conforms to the firewall deny rule and needs to be blocked, or all the received service data does not conform to the firewall allow rule and needs to be blocked, the virtual terminal determines that the service does not need to wake up the mobile terminal, so step 202 is performed, and the virtual terminal continues executing, in place of the mobile terminal, the service corresponding to the hosting rule. When the hosting rule is executing the user-defined operation, and if the user-defined operation occurs, the virtual terminal determines that the service needs to wake up the mobile terminal, so step 204 is performed, and otherwise, step 202 is performed.

204: When the service needs to wake up the mobile terminal, the virtual terminal residing on the server instructs the mobile terminal to wake up the mobile terminal, and the mobile terminal, after being woken up, may further process the service.

According to different hosting rules, step 204 specifically includes one or a combination of the following specific implementations.

Specific implementation a): the hosting rule may be that the virtual terminal executes the path connecting operation in place of the mobile terminal, and the path connecting operation may include the periodical polling operation or the periodical heartbeat operation. Here, when the service corresponding to the path connecting operation has actual service data, the virtual terminal wakes up the mobile terminal and sends the service data to the mobile terminal for processing.

For example, according to the prior art, the mobile terminal synchronizes once every 28 minutes to receive emails in real time. Even though there is no email, the mobile terminal still needs to be woken up to execute synchronization and email receiving operations regularly, causing large power consumption of the mobile terminal. According to the method provided by the embodiment, the virtual terminal residing on the server executes the synchronization and email receiving operations regularly. If an email is not received, the mobile terminal does not need to be woken up; and when an email is received, namely, there is actual service data, the mobile terminal is woken up and the email is sent to the mobile terminal for processing. In this way, assuming that no email is received within 12 hours at night, (12*60/28) times that the mobile terminal is to be woken up may be reduced, which effectively reduces the power consumption of the mobile terminal.

Specific implementation b): the hosting rule may be that the virtual terminal executes the firewall filtering operation in place of the mobile terminal, and here when the received service data does not conform to the firewall deny rule or conforms to firewall allow rule, the virtual terminal wakes up the mobile terminal and sends the service data to the mobile terminal for processing.

Furthermore, when the received service data conforms to the firewall deny rule or does not conform to the firewall allow rule, the service data may be blocked and discarded. In this way, the mobile terminal may avoid resolving some junk service data, for example, a malicious connection request sent by a hacker, so that the power consumption is reduced, and the service data may be normally received and sent without being affected.

In addition, the related firewall deny rule or the firewall allow rule in the embodiment may be customized according to the requirements of a mobile terminal, namely, the related firewall deny rule or firewall allow rule in the embodiment may be adjusted according to the requirements of the user of a mobile terminal, so that every mobile terminal may have user-defined firewall rules on the server. Compared with the firewall rules applicable to all mobile terminals in the prior art, the requirements of the user may be better satisfied.

Specific implementation c): the hosting rule may be that the virtual terminal executes user-defined operations in place of the mobile terminal, and when a user-defined operation occurs, the virtual terminal wakes up the mobile terminal, and sends service data corresponding to the user-defined operation to the mobile terminal for processing.

Taking an example that the user-defined operation is auto-reply and accumulation of auto-reply information: if the mobile terminal entrusts the virtual terminal to perform auto-reply of IM (Instant Messaging, Instant Messaging), the virtual terminal, after receiving a message sent by other parties, sends an automatic reply, and temporarily stores an automatically replied message in the virtual terminal; and then, when the temporarily stored automatically replied message meets a certain condition, for example, the number of temporarily stored messages reaches a preset number, or the storing time of a message reaches a preset duration, the virtual terminal wakes up the mobile terminal and sends the temporarily stored message to the physical terminal, thereby avoiding waking up the mobile terminal frequently, and effectively reducing the power consumption of the mobile terminal.

In this embodiment, through installing the service application same as that of the mobile terminal on the server, receiving a hosting rule entrusted by the mobile terminal, invoking a corresponding service application according to the hosting rule, and executing, in place of the mobile terminal, a service corresponding to the hosting rule, and waking up the mobile terminal only when the service needs to wake up the mobile terminal, so that the number of times of waking up the mobile terminal is reduced to a great extent, thereby reducing the power consumption of the mobile terminal, and extending the standby time and service life of the mobile terminal.

Embodiment 3

Figure 3:
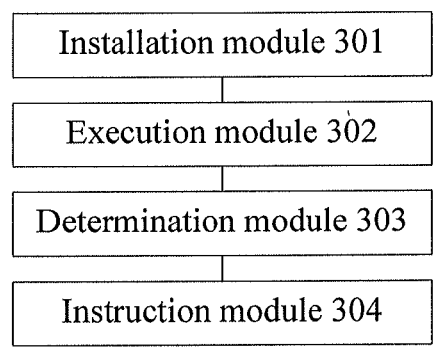
FIG. 3 is a schematic structural view of a server according to Embodiment 3 of the present invention.

Referring to FIG. 3, an embodiment provides a server, which includes:

an installation module 301, configured to install a service application same as that of a mobile terminal;

an execution module 302, configured to run the service application, and execute, in place of the mobile terminal, a service corresponding to the service application;

a determination module 303, configured to determine, according to a result of executing the service, whether the mobile terminal needs to be woken up; and an instruction module 304, configured to instruct the mobile terminal to process the service when the service needs to wake up the mobile terminal.

When the service is a periodical polling operation or a periodical heartbeat operation, the determination module 303 is configured to determine whether the periodical polling operation or the periodical heartbeat operation receives service data, and when the service data is received, determine that the terminal needs to be woken up.

When the service is a firewall filtering operation, the determination module 303 is configured to determine whether the firewall filtering operation receives service data that conforms to a firewall allow rule, and when the service data that conforms to the firewall allow rule is received, determine that the mobile terminal needs to be woken up.

When the service is a user-defined operation, the determination module 303 is configured to determine whether the user-defined operation occurs; and when it is detected that the user-defined operation occurs, determine that the mobile terminal needs to be woken up.

The user-defined operation may be an auto-reply operation.

The installation module 301 is configured to install a part or all of initial service applications installed on the mobile terminal, and/or, install a part or all of updated service applications installed on the mobile terminal when the service applications on the mobile terminal are updated.

The execution module 302 is configured to receive a hosting rule entrusted by the mobile terminal; and according to the hosting rule, invoke a service application corresponding to the hosting rule, and execute, in place of the mobile terminal, a service corresponding to the service application.

The instruction module 304 is configured to wake up the mobile terminal and instruct the mobile terminal that a service needs to be processed by the mobile terminal; or wake up the mobile terminal and send, to the mobile terminal, service data of the service that needs to be processed by the mobile terminal.

In this embodiment, through installing the service application same as that of the mobile terminal on the server, receiving a hosting rule entrusted by the mobile terminal, invoking a corresponding service application according to the hosting rule, and executing, in place of the mobile terminal, a service corresponding to the hosting rule, and waking up the mobile terminal only when the service needs to wake up the mobile terminal, so that the number of times of waking up the mobile terminal is reduced to a great extent, thereby reducing the power consumption of the mobile terminal, and extending the standby time and service life of the mobile terminal.

The embodiments of the present invention may be implemented by using software or programs. The programs may be stored in a computer readable storage medium, such as a hard disk, cache or an optical disk.

The above descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. A service processing method, comprising:
setting, on a server, a virtual terminal corresponding to a mobile terminal, wherein a service application is installed on the server, the service application also is installed on the mobile terminal;
establishing, by the virtual terminal on the server, an entrusting language with the mobile terminal, and receiving a hosting rule entrusted and sent by the mobile terminal according to the entrusting language, the hosting rule not being agreed on in advance by the mobile terminal and the virtual terminal, the hosting rule and the service application corresponding to each other;
after receiving the hosting rule entrusted by the mobile terminal, invoking, by the virtual terminal on the server, the service application corresponding to the hosting rule, and executing, on behalf of the mobile terminal, a service corresponding to the service application;
determining, by the virtual terminal on the server according to a result of executing the service, whether the mobile terminal needs to be woken up; and
when the service needs to wake up the mobile terminal, instructing, by the virtual terminal on the server, waking up the mobile terminal to process the service;
wherein when the service is a firewall filtering operation, the determining, by the virtual terminal on the server according to a result of executing the service, whether the mobile terminal needs to be woken up comprises: determining, by the virtual terminal on the server, whether the firewall filtering operation receives service data conforming to a firewall allow rule; and when the virtual terminal on the server receives the service data conforming to the firewall allow rule, determining that the mobile terminal needs to be woken up; and
wherein when the service is a user-defined operation, the determining, by the virtual terminal on the server according to a result of executing the service, whether the mobile terminal needs to be woken up comprises: determining, by the virtual terminal on the server, whether the user-defined operation occurs; and when the virtual terminal on the server detects that the user-defined operation occurs, determining that the mobile terminal needs to be woken up.

2. The method according to claim 1, wherein when the service is a periodical polling operation or a periodical heartbeat operation, the determining, by the virtual terminal on the server, according to a result of executing the service, whether the mobile terminal needs to be woken up comprises:
determining, by the virtual terminal on the server, whether the periodical polling operation or the periodical heartbeat operation receives service data; and when the server receives the service data, determining that the mobile terminal needs to be woken up.

3. The method according to claim 1, wherein the installing, on the server, the service application comprises at least one of:
installing a part or all of initial service applications installed on the mobile terminal; and
installing a part or all of updated service applications installed on the mobile terminal when the service applications on the mobile terminal are updated.

4. The method according to claim 1, wherein the instructing, by the virtual terminal on the server, waking up the mobile terminal to process the service comprises one of:
waking up, by the virtual terminal on the server, the mobile terminal, and instructing the mobile terminal that the service needs to be processed by the mobile terminal; or
waking up, by the virtual terminal on the server, the mobile terminal, and sending, to the mobile terminal, service data of the service that needs to be processed by the mobile terminal.

5. A server, wherein the server comprises a processor and a non-transitory computer readable storage medium having programs stored thereon, the programs including a plurality of units, the units comprising:
an unit, configured to set a virtual terminal corresponding to a mobile terminal on the server;
an installation module, configured to install a service application on the server, the application also being installed on the mobile terminal;
the virtual terminal, configured to establish an entrusting language with the mobile terminal, and receive a hosting rule entrusted and sent by the mobile terminal according to the entrusting language, the hosting rule not being agreed on in advance by the mobile terminal and the virtual terminal, the hosting rule and the service application corresponding to each other;
the virtual terminal configured to, after receiving the hosting rule entrusted by the mobile terminal, invoke the service application corresponding to the hosting rule, and executes, on behalf of the mobile terminal, a service corresponding to the service application;
the virtual terminal configured to determine whether the mobile terminal needs to be woken up according to a result of executing the service; and
when the service needs to wake up the mobile terminal, the virtual terminal configured to instruct waking up the mobile terminal to process the service;
wherein when the service is a firewall filtering operation, the virtual terminal is configured to: determine whether the firewall filtering operation receives service data conforming to a firewall allow rule; and when the service data conforming to the firewall allow rule is received, determine that the mobile terminal needs to be woken up; and
wherein when the service is a user-defined operation, the virtual terminal is configured to: determine whether the user-defined operation occurs; and when it is detected that the user-defined operation occurs, determine that the mobile terminal needs to be woken up.

6. The server according to claim 5, wherein when the service is a periodical polling operation or a periodical heartbeat operation, the virtual terminal is configured to:
determine whether the periodical polling operation or the periodical heartbeat operation receives service data; and when the service data is received, determine that the mobile terminal needs to be woken up.

7. The server according to claim 5, wherein the installation module is configured to install a part or all of at least one of:
  initial service applications installed on the mobile terminal; and/or
  updated service applications installed on the mobile terminal when the service applications on the mobile terminal are updated.

8. The server according to claim 5, wherein the virtual terminal is configured to one of:
  wake up the mobile terminal, and instruct the mobile terminal that the service needs to be processed by the mobile terminal; or
  wake up the mobile terminal, and send, to the mobile terminal, service data of the service that needs to be processed by the mobile terminal.

9. A server, comprising:
  one or more processors coupled to a storage medium and configured to:
  set, on a server, a virtual terminal corresponding to a mobile terminal, a service application being installed on the server, the service application also being installed on the mobile terminal;
  establish, by the virtual terminal on the server, an entrusting language with the mobile terminal, and receive a hosting rule entrusted and sent by the mobile terminal according to the entrusting language, the hosting rule not being agreed on in advance by the mobile terminal and the virtual terminal, the hosting rule and the service application corresponding to each other;
  after receiving the hosting rule entrusted by the mobile terminal, invoke, by the virtual terminal on the server, the service application corresponding to the hosting rule, and execute, on behalf of the mobile terminal, a service corresponding to the service application;
  determine, by the virtual terminal on the server according to a result of executing the service, whether the mobile terminal needs to be woken up; and
  when the service needs to wake up the mobile terminal, instruct, by the virtual terminal on the server, waking up the mobile terminal to process the service;
  when the service is a firewall filtering operation, the determining, by the virtual terminal on the server according to a result of executing the service, whether the mobile terminal needs to be woken up comprises: determining whether the firewall filtering operation receives service data conforming to a firewall allow rule; and when the server receives the service data conforming to the firewall allow rule, determining that the mobile terminal needs to be woken up; and
  when the service is a user-defined operation, the determining by the virtual terminal on the server according to a result of executing the service, whether the mobile terminal needs to be woken up comprises: determining whether the user-defined operation occurs; and when the server detects that the user-defined operation occurs, determining that the mobile terminal needs to be woken up.

10. The server according to claim 9, wherein the one or more processors are further configured to: when the service is a periodical polling operation or a periodical heartbeat operation, the determining, by the virtual terminal on the server according to a result of executing the service, whether the mobile terminal needs to be woken up comprises:
  determining whether the periodical polling operation or the periodical heartbeat operation receives service data; and
  when the server receives the service data, determining that the mobile terminal needs to be woken up.

11. A non-transitory computer readable storage medium with an executable program stored thereon, wherein the program instructs one or more processors to:
  set, on a server, a virtual terminal corresponding to a mobile terminal, a service application being installed on the server, the service application also being installed on the mobile terminal;
  establish, by the virtual terminal on the server, an entrusting language with the mobile terminal, and receive a hosting rule entrusted and sent by the mobile terminal according to the entrusting language, the hosting rule not being agreed on in advance by the mobile terminal and the virtual terminal, the hosting rule and the service application corresponding to each other;
  after receiving the hosting rule entrusted by the mobile terminal invoke, by the virtual terminal on the server, the service application corresponding to the hosting rule, and executes, on behalf of the mobile terminal, a service corresponding to the service application;
  determine, by the virtual terminal on the server according to a result of executing the service, whether the mobile terminal needs to be woken up; and
  when the service needs to wake up the mobile terminal, instruct, by the virtual terminal on the server, waking up the mobile terminal to process the service;
  wherein when the service is a firewall filtering operation, the determining, by the virtual terminal on the server according to a result of executing the service, whether the mobile terminal needs to be woken up comprises: determining, by the virtual terminal on the server, whether the firewall filtering operation receives service data conforming to a firewall allow rule; and when the virtual terminal on the server receives the service data conforming to the firewall allow rule, determining that the mobile terminal needs to be woken up; and
  wherein when the service is a user-defined operation, the determining, by the virtual terminal on the server according to a result of executing the service, whether the mobile terminal needs to be woken up comprises: determining, by the virtual terminal on the server, whether the user-defined operation occurs; and when the virtual terminal on the server detects that the user-defined operation occurs, determining that the mobile terminal needs to be woken up.

* * * * *